United States Patent [19]

Dibowski et al.

[11] 4,126,207

[45] Nov. 21, 1978

[54] SPLASH LUBRICATING SYSTEM FOR COAL GRINDING ROLLS

[75] Inventors: Günter Dibowski, Essen; Helmut Grammes, Duisburg, both of Germany

[73] Assignee: Deutsche Babcock Aktiengesellschaft, Germany

[21] Appl. No.: 770,374

[22] Filed: Feb. 22, 1977

[30] Foreign Application Priority Data

Mar. 24, 1976 [DE] Fed. Rep. of Germany ....... 2612390

[51] Int. Cl.$^2$ ........................ F16N 29/02; B02C 15/00

[52] U.S. Cl. .................................... 184/1 C; 241/110; 184/6.4

[58] Field of Search ......................... 241/122, 107–119; 184/11 R, 1 C, 6, 6.4, 6.14, 6.28, 7 R, 8, 13 R, 27 C, 66, 103 R, 105 R

[56] References Cited

U.S. PATENT DOCUMENTS

| | | | |
|---|---|---|---|
| 1,317,961 | 10/1919 | Conwell | 184/103 R |
| 1,576,385 | 3/1926 | Watts | 184/6.4 |
| 1,670,750 | 5/1928 | Simpson | 241/116 X |
| 1,705,845 | 3/1929 | Woodman | 184/103 R |
| 2,564,231 | 8/1951 | Pitney | 184/103 R X |
| 3,042,147 | 7/1962 | Hutchings | 184/6.22 |
| 3,658,264 | 4/1972 | Schauer | 241/121 |
| 3,720,288 | 3/1973 | Tschabold | 184/6.4 |
| 3,730,446 | 5/1973 | Piepho | 241/110 |
| 3,876,037 | 4/1975 | Rath | 184/6.4 |
| 3,912,178 | 10/1975 | Grommes | 241/110 |

*Primary Examiner*—David H. Brown
*Attorney, Agent, or Firm*—McGlew and Tuttle

[57] ABSTRACT

A splash lubricating system for supplying oil to an interior reservoir for the bearings of grinding rolls, comprises an interior oil supply reservoir formed in the hub of the grinding rolls and at least one exterior oil supply line is connected from an exterior reservoir to the interior reservoir of the hub. Oil level indicating means are associated with the exterior oil supply reservoir for indicating changes of oil levels in the interior reservoir and for stopping the driving of the rolls if the oil level should fall below a predetermined amount. Two such exterior reservoirs may be provided, and one is advantageously connected to a separate oil supply tank for replenishing the oil in the interior reservoir of the grinding roller.

4 Claims, 1 Drawing Figure

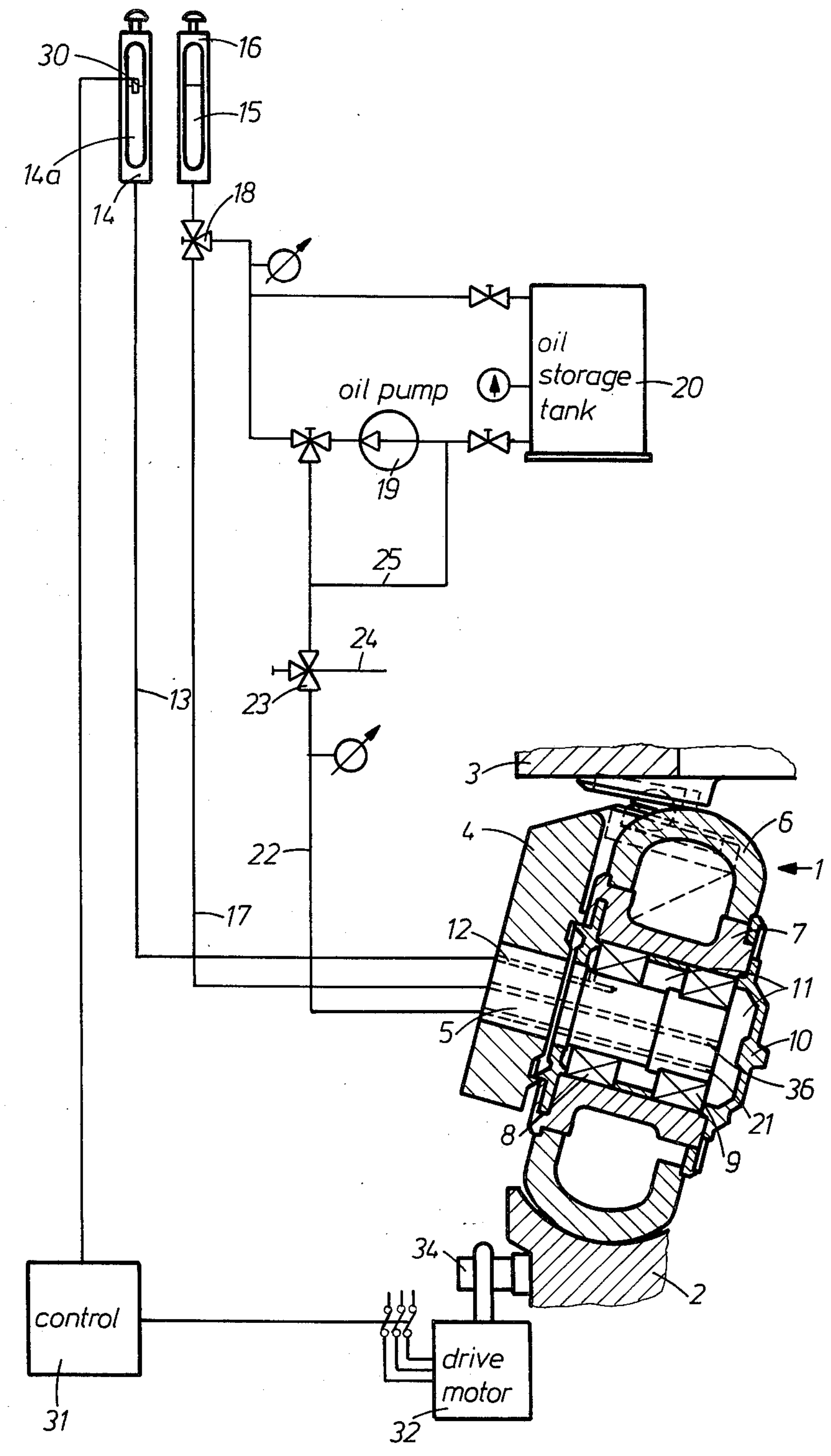
30
16
15
14a
14
18
oil storage tank
20
oil pump
19
25
24
23
13
3
4
6
1
22
17
12
7
11
5
10
36
21
8
9
34
2
control
31
drive motor
32

SPLASH LUBRICATING SYSTEM FOR COAL GRINDING ROLLS

FIELD AND BACKGROUND OF THE INVENTION

This invention relates in general to the construction of coal grinding rolls and, in particular, to a new and useful splash lubricating system for the bearings of the grinding rolls.

DESCRIPTION OF THE PRIOR ART

The present invention relates particularly to a splash lubricating system for bearings of grinding rolls. Such grinding rolls, which are suitable particularly for coal crushing mills in power stations, are mounted in an inclined position on a pressure-loaded shaft. The oil in the interior of the hub is usually maintained at a level such that, at the lowermost level, the antifriction bearings barely dip into the oil bath. The oil is filled in through a separate filling connection, with the mill stopped. In order to prevent bearing damages caused by insufficient lubrication, which may lead to the shutdown of the entire mill, there must be a means of checking the oil level. The oil level may be determined, for example, by an oil measuring stick. This method is simple, but it requires the stopping of the mill. It is also known to provide a remote monitoring of the oil level, and for this purpose, a probe may be used which is introduced into the oil bath through a bore in the shaft. However, with this monitoring system, as soon as the oil level drops below a predetermined minimum, the mill must be instantly put out of operation.

SUMMARY OF THE INVENTION

The present invention is directed to an improvement of the splash lubrication of grinding roll bearings through a self-regulating monitoring of the oil level.

To this end, and in accordance with the invention, it is provided that the oil bath communicates through a respective line or lines with one or several oil supply reservoirs, with each of the lines establishing connection to one of the oil reservoirs, and that the oil supply reservoir is provided with an oil level indicator. With this arrangement, the oil level can be checked from outside of the mill. Small losses of oil are automatically re-supplied from the oil supply reservoir. The respective mill can then still operate for a certain period of time, without running the risk of a bearing damage.

Any necessary inspection may then take place on the occasion of a later stopping of the plant. This makes it possible to reduce the shutdown periods of the mill. In addition, this system of monitoring renders it possible to provide a full level lubrication of the entire interior of the hub, so that the bearings are still completely immersed in the oil bath.

In an advantageous development of the invention, an oil supply reservoir is connected through an oil pump to an oil storage tank which, in turn, is connected to an oil outlet connection of the hub. This makes it possible to provide oil changes and oil filling during operation.

Further, the oil level gauge of the oil supply reservoir may be electrically connected to the closed-loop control of the drive of the mill. With this provision, the oil level can be included in the blocking system of the mill.

Accordingly, it is an object of the invention to provide a splash lubricating system for supplying oil to an interior reservoir of a coal grinding roll for lubricating the bearings of such rolls and which includes one or more oil supply lines connected to an exterior reservoir which has oil level indicating means associated therewith.

A further object of the invention is to provide an oil lubricating system for the bearings of grinding rolls which is simple in design, rugged in construction and economical to manufacture.

The various features of the invention are pointed out with particulaity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the drawing:

The only FIGURE of the drawing is a sectional view of a coal grinding roll construction with a lubricating system constructed in accordance with the invention.

DESCRIPTION OF THE PREFERRED EMBODIMENT

Referring to the drawing in particular, the invention embodied therein, shows a longitudinal sectional view of a grinding mill, having a splash lubricating system constructed in accordance with the invention. In the example described, the inventive splash lubrication system is shown as applied to the bearings of grinding rolls of a coal mill in a power station. However, the invention may also be applied to any other bearings which are lubricated by splashing.

The coal mill comprises three stationary grinding rolls, generally designated 1, which roll on a rotating ring-shaped grinding pan 2. The grinding pan is driven by a motor 32. The grinding force is applied to a grinding roll shaft 5 by a pressure frame 3, through a pressure member 4. Grinding roll 1 comprises a roll shell 6 which is removably secured to a hub 7.

Hub 7 is mounted on shaft 5 by means of two antifriction bearings, a movable bearing 8 and a fixed bearing 9. At the front side of grinding roll 1, hub 7 is closed by a cover 10 screwed thereon. For lubricating bearings 8, 9, there is an oil reservoir or space 11 formed in the interior of hub 7 which is filled with lubricating oil.

In order to monitor the oil level in the reservoir 11 of the hub, the following system is provided, which is shown in the drawing only diagrammatically: An oil line 13 is provided which leads from an oil supply reservoir 14, filled with oil 15, to a bore 12 in the shaft 5, through which the line is connected to reservoir 11 of the hub. Oil losses occuring in the bearings are compensated for by an additional flow of oil from the exterior supply reservoir 14 through line 13 into the interior reservoir 11 of the hub. Oil level indicating means in the form of a sight glass 14*a* are provided for the supply reservoir 14 and the oil level can be read through the inspection glass. Consequently, oil losses are indicated by a fall of the oil level in oil supply reservoir 14 as shown in the glass 14*a*. A float 30 is advantageously employed which is connected through a control 31 to deliver electric pulses to a drive motor 32 of grinding pan 2 driving through gearing 34, so that the mill is stopped as soon as the oil level drops below a minimum value.

A further oil supply reservoir 16 is provided which is also equipped with an oil level indication in the form of an inspection glass 15, and it is connected through another oil line 17 and a bore 36 in shaft 5, to the interior reservoir 11 of the hub. Through this second oil line 17, by means of an oil pump 19, lubricating oil can be fed from an oil storage tank 20 through a three-way valve 18 to the hub. From an outlet bore 21 extending through shaft 5, a further oil line 22 leads to another three-way valve 23 which is connected to an outlet line 24 as well as through a line 25 to oil pump 19 and oil storage tank 20. With a corresponding arrangement for switching the valves mounted in the system of conduits which has been shown and described, oil can be filled or changed during the operation of the mill.

While a specific embodiment of the invention has been shown and described in detail to illustrate the application of the principles of the invention, it will be understood that the invention may be embodied otherwise without departing from such principles.

What is claimed is:

1. A splash lubricating system for supplying oil to an interior reservoir of a coal grinding apparatus for lubricating the bearings of a grinding roll, comprising a grinding roll, ring means cooperative with said grinding roll to grind material therebetween, bearing means rotatably supporting said grinding roll including an interior oil reservoir, a plurality of exterior oil supply reservoirs each having a separate oil supply line connected therefrom to said interior oil reservoir, at least one of said exterior supply reservoirs having an oil storage tank, a pump connected to said oil storage tank and to said interior oil reservoir for directing the oil from said storage tank to the reservoir, and level indicating means associated with each of said exterior supply reservoirs for indicating the level of oil in said interior reservoir.

2. A splash lubricating system, according to claim 1, including an exterior oil storage tank, at least one of said exterior reservoirs being connected to said tank.

3. A splash lubricating system, according to claim 1, wherein said grinding roll includes a pan associated with said roll and which is rotatable relative to said roll, drive means for driving said pan, said oil level indicating means being connected to said drive means for controlling said drive means in accordance with the oil level indication.

4. A splash lubricating system, according to claim 1, including at least one first supply reservoir and at least one second supply reservoir each of them connected to said interior oil reservoir within said grinding roll by a separate supply line, each of said indicating means associated with each of said first and second supply reservoirs for indicating the level of oil in said first and second supply reservoirs, said oil storage tank connected to said second supply reservoir, at least one third connecting line from said oil storage tank to said interior oil reservoir within said grinding roll, said pump connected to said third connecting line for circulating oil within said third connecting line.

* * * * *